INVENTORS
Jay M. Steinberg
Arnold J. Rosenthal
BY C. B. Barris
ATTORNEY

United States Patent Office 3,539,677
Patented Nov. 10, 1970

3,539,677
THERMALLY STABLE POLYMERIC FIBERS AND
PROCESS FOR PRODUCING SAME
Jay M. Steinberg, Plainfield, and Arnold J. Rosenthal,
Whippany, N.J., assignors to Celanese Corporation,
New York, N.Y., a corporation of Delaware
Filed Aug. 2, 1967, Ser. No. 657,868
Int. Cl. D01f 7/04
U.S. Cl. 264—184          9 Claims

ABSTRACT OF THE DISCLOSURE

The invention relates to a process for producing filamentary material exhibiting improved tensile factors at elevated temperatures by extruding a solution of benzimidazobenzophenanthroline· polymer in sulfuric acid (about 2 to 15 percent by weight of polymer based on the total weight of said solution) through a spinneret to form a filament of the solution, passing said filament through a sulfuric acid/water coagulation bath which has a concentration of 50 to 80 percent by weight of sulfuric acid and which is maintained at a temperature of between 45 and 80° C. It is preferred that the benzimidazobenzophenanthroline polymer solution has an I.V. of between about 1.0 and 4.0.

---

Figure 1:
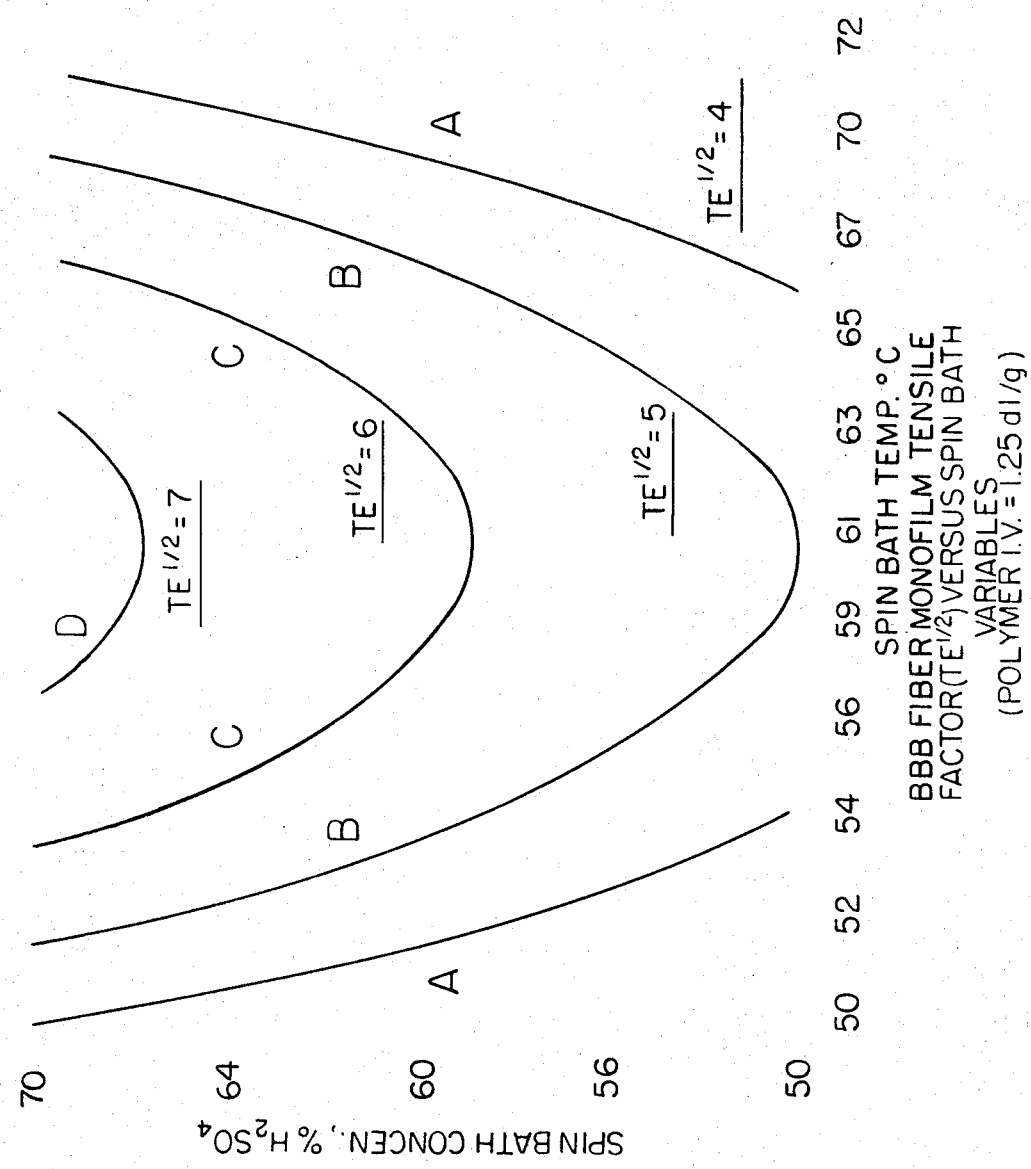

This invention relates to a process for producing fibers from benzimidazo-benzophenanthroline polymers. More particularly, this invention relates to a process for producing wet-spun fibers from poly(bisbenzimidazobenzophenanthroline), herein referred to as BBB polymers, which fibers evidence improved characteristics.

As employed herein, the term "tensile factor" ($TE^{\frac{1}{2}}$) is an index of fiber organization wherein T is tenacity at break in grams per denier and E is elongation in percent extension from the original length to length at break in a tensile test. An explanation of this term is set forth more fully in Textile Research Journal 36, No. 7, 593–602, July 1966.

The process of the present invention, by means of certain critical spinning conditions which are hereinlater set forth, provides optimum precursor fibers which aid greatly in achieving after-drawn fibers of superior tensile properties and strength-retention ability at elevated temperatures, e.g., temperatures as high as 800° C. or more.

Such characteristics are of particular advantage for use in aerospace flight decelerators, for example, wherein all of said characteristics must be incorporated by necessity.

Broadly, the benzimidazo-benzophenanthroline polymers to which the present invention is directed can be characterized as being the reaction product of at least one organic tetra-amine having the structural formula:

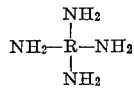

wherein R is an aromatic or cycloaliphatic tetravalent radical, each amino group of said tetra-amine attached directly to a carbon atom of a ring of said aromatic or cycloaliphatic radical ortho or peri to the carbon atom to which another amino group is directly attached; with at least one tetracarboxylic acid having the structural formula:

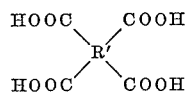

wherein R' is a tetravalent radical containing at least 2 carbon atoms and no more than 2 carboxy groups of said acid are attached to any one carbon atom of said tetravalent radical.

The reaction involved in the formation of the polymers of this invention may be effected in an organic solvent for at least one of the reactants, the solvent being inert to the reactants, preferably under anhydrous conditions, at a temperature below 125° C., preferably below 100° C., and for a time sufficient to provide the desired reaction product without gelation. Subsequent high temperature heating is required to completely cyclize the polymer. The tetra-amine and tetracarboxy acid are preferably reacted in substantially equimolar quantities. Additionally, the polymerization may be effected in an inorganic solvent such as polyphosphoric acid by heating at temperatures of 100–250° C. for a sufficient time to produce the desired molecular weight.

It is preferable that the molecular weight of the polymers utilized herein be such that the inherent viscosity of the polymer be at least 0.3, preferably 0.5 to 5.0. The inherent viscosity is measured at 25° C. at a concentration of 0.4 g. of polymer per 100 ml. of solvent. The solvent suitable for the purpose of the present invention has been chosen as 97% sulfuric acid (by weight). The viscosity of the polymer solution is measured relative to that of the solvent alone and the inherent viscosity (I.V.) equals:

$$\frac{\text{Natural logarithm}\left(\frac{\text{viscosity of solution}}{\text{viscosity of solvent}}\right)}{C} \quad (I)$$

where C is the concentration expressed in grams of polymer per 100 milliliters of solution. As is known in the polymer art, inherent viscosity is monotonically related to the molecular weight of the polymer.

The starting materials for forming the products of the present invention are at least one tetra-amine and at least one tetracarboxylic acid. Non-limiting examples of the tetra-amine compounds are: 3,3'-diaminobenzidine; bis(3,4-diamino phenyl) methane; 1,2-bis(3,4-diamino phenyl) ethane; 2,2-bis(3,4-diamino phenyl) propane; bis(3,4-diamino phenyl) ether; bis(3,4-diamino phenyl) sulfide; bis(3,4-diamino phenyl) sulfone; 1,2,4,5-tetra-amino benzene; 2,3,6,7-tetra-amino naphthalene; etc.; and the corresponding ring-hydrogenated tetra-amines.

Non-limiting example of the tetracarboxylic acids include: pyromellitic acid; 2,3,6,7-naphthalene tetracarboxylic acid; 3,3',4,4'-diphenyl tetracarboxylic acid; 1,4,5,8-naphthalene tetracarboxylic acid; 2,2',3,3'-diphenyl tetracarboxylic acid; 2,2-bis(3,4-dicarboxyphenyl) propane acid; bis(3,4-dicarboxyphenyl) sulfone acid; 3,4,9,10-perylene tetracarboxylic acid; bis(3,4-dicarboxyphenyl) ether acid; ethylene tetracarboxylic acid; naphthlene-1,2,4,5-tetracarboxylic acid; decahydronaphthalene-1,4,5,8-tetracarboxylic acid; 4,8-dimethyl-1,2,3,5,6-hexahydronaphthalene-1,2,5,6-tetracarboxylic acid; 2,6-dichloronaphthalene-1,4,5,8-tetracarboxylic acid; 2,7-dichloronaphthalene-1,4,5,8-tetracarboxylic acid; 2,3,6,7-tetrachloronaphthalene-1,4,5,8-tetracarboxylic acid; phenanthrene-1,8,9,10-tetracarboxylic acid; cyclopentane-1,2,3,4-tetracarboxylic acid; pyrrolidine-2,3,4,5-tetracarboxylic acid; pyrazine-2,3,5,6-tetracarboxylic acid; 2,2-bis(2,3-dicarboxyphenyl) propane acid; 1,1-bis(2,3-dicarboxyphenyl) ethane acid; 1,1-bis(3,4-dicarboxyphenyl) ethane acid; bis(2,3-dicarboxyphenyl) methane acid; bis(3,4-dicarboxyphenyl) methane acid; bis(3,4-dicarboxyphenyl) sulfone acid; benzene-1,2,3,4-tetracarboxylic acid; 1,2,3,4-butane tetracarboxylic acid; thiophene-2,3,4,5-tetracarboxylic acid; and the like.

In the preferred embodiment, the present invention is directed to fibers formed from poly(bisbenzimidozobenzophenanthroline), i.e., BBB polymers. Such polymers are formed from 1,4,5,8-naphthalene tetracarboxylic acid and 3,3'-diamino benzidine according to Equation I.

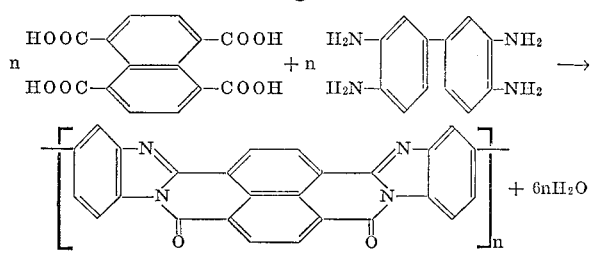

A preferable method of preparing BBB polymers includes effecting the polymerization in polyphosphoric acid (PPA) where the reaction according to Equation I occurs producing fully cyclized polymer. Use of polyphosphoric acid as the solvent permits reactions to be carried out over a wide range of temperatures, e.g., 80° C. to 300° C. The polyphosphoric acid preferably employed has a $P_2O_5$ equivalent of about 82 to 84 percent which is a solution of approximately 5 to 20 percent ortho- and pyrophosphoric acids mixed with various polyphosphoric acids, mostly trimers, tetramers, pentamers and hexamers.

It is found that both reaction temperatures and reaction periods significantly affect degrees of polymerization. Generally, reaction times range from 0.5 to 100 hours at the above mentioned reaction temperatures. Data from a number of polymerization reactions seem to indicate that higher reaction temperatures result in polymer products having higher intrinsic viscosity than polymers produced at lower temperatures and at comparable reaction times.

The polymers prepared in the above manner are generally deep red and exhibit metallic luster. They can be characterized as being tough, that is, extremely difficult to grind. A typical pulverized sample was found to be completely amorphous by X-ray diffraction and to have no softening point up to 450° C., the limiting temperature of the apparatus used. Solutions of polymers in concentrated $H_2SO_4$, PPA, benzene sulfonic acid and methane sulfonic acid are intensely colored red. Aqueous KOH solutions are brown. Cyclized BBB polymers appear to be insoluble in dimethylformamide, dimethylacetamide, dimethylsulfoxide, cresol, tetramethylene sulfone, hexamethyl prosphoramide and other more common organic solvents. Low viscosity polymers exhibit some tendencies to dissolve in perfluoroacetic acid and formic acid.

In accordance with the present invention, the benzimidazo-benzophenanthrolines, e.g., BBB polymers, are usually formed into filaments by wet spinning methods, i.e., extruding a solution of the polymer in an appropriate solvent, such as sulfuric acid, through an opening of predetermined shape into a coagulation bath, e.g., sulfuric acid/water coagulation bath, which results in a filamentary material of the desired cross-section. Polymer solutions may be prepared, for example, by dissolving sufficient polymer in the solvent to yield a final solution suitable for extrusion which contains about 2 to 15 percent by weight, preferably about 3 to 10 percent by weight, of polymer based on the total weight of solution. It is found that the polymer dissolves most readily on warming to a temperature of between about 50 to 70° C. to produce a viscous, deep purple solution. If sulfuric acid is employed, from 85 to 107 equivalent weight percent sulfuric acid, preferably 92 to 102 equivalent weight percent sulfuric acid is employed as the solvent. The polymeric spinning solution is then extruded into a coagulation bath, i.e., wet spun, to form filaments in accordance with the present invention.

Accordingly, it is found that to obtain the objectives of the present invention, the coagulation bath, i.e., sulfuric acid/water coagulation bath, into which the filamentary materials are extruded must be maintained within certain parameters. Thus, in order to spin a polymeric solution having an I.V. up to about 4.0, e.g., between about 1.0 and 4.0, the sulfuric/water coagulation bath must be maintained at a temperature ranging from between about 45 to 80° C., preferably about 60 to 70° C., optimally about 60° C. The sulfuric/water coagulation bath must also be maintained within about 50 to 80% (by weight), preferably about 60 to 75% (by weight), optimally 70–75% (by weight) sulfuric acid in concentration. Although other combinations of temperature and concentration of coagulation bath may be employed, the coagulation bath must be maintained within the above parameters in order to obtain a precursor (as-spun) fiber which is suitable for producing after-drawn fibers of superior tensile properties and strength retention at the extreme elevated temperatures contemplated by the present invention.

After extrusion, the filaments are washed thoroughly in order to remove excess acid and to minimize contamination. Then they are dried overnight prior to being drawn in order to improve their physical characteristics, e.g., tenacity, elongation, thermal resistance, etc.

The final (drawn) product resulting from this invention advantageously exhibits superior tensile properties and strength-retention ability at elevated temperatures, e.g., 60% strength retention @ 600° C.

The following examples further illustrate the invention.

EXAMPLE I

Poly(bisbenzimidazobenzophenanthroline) i.e., the reaction product of 1,4,5,8-naphthalene tetracarboxylic acid and 3,3′-diamino benzidine, (BBB polymer), having an I.V. of 1.25 dl./g. in 97 percent sulfuric acid, was dissolved in 97 percent sulfuric acid to form a spinning solution having 10.5 weight percent solids, viscosity of 4300 poise at 30° C. This solution was extruded from a bomb under pressure of 50 p.s.i. of nitrogen through a spinneret having 1 orifice of 100 microns in diameter and into a sulfuric acid/water coagulation bath in which the temperature and concentration were varied from about 50 to 72° C. and from 52 to 68 percent sulfuric acid, respectively. The precursor samples were washed 30 minutes in water @ 50° C., dried overnight in air @ 25° C. and submitted for physical testing. Resulting tensile factors were plotted against coagulating bath conditions and the results are illustrated in FIG. 1.

EXAMPLE II

To examine further the effects of polymer I.V. and spin-bath conditions on as-spun fiber properties (in particular, tensile factor), data were fit by a second degree polynomial, using polymer I.V., spin-bath temperature and spin-bath concentration as the independent variables. The resulting equation, plotted as a contour map of tensile factors versus spin-bath temperature and polymer inherent viscosity for a fixed bath concentration of 70 percent $H_2SO_4$, is illustrated in FIG. 2.

Figure 2:
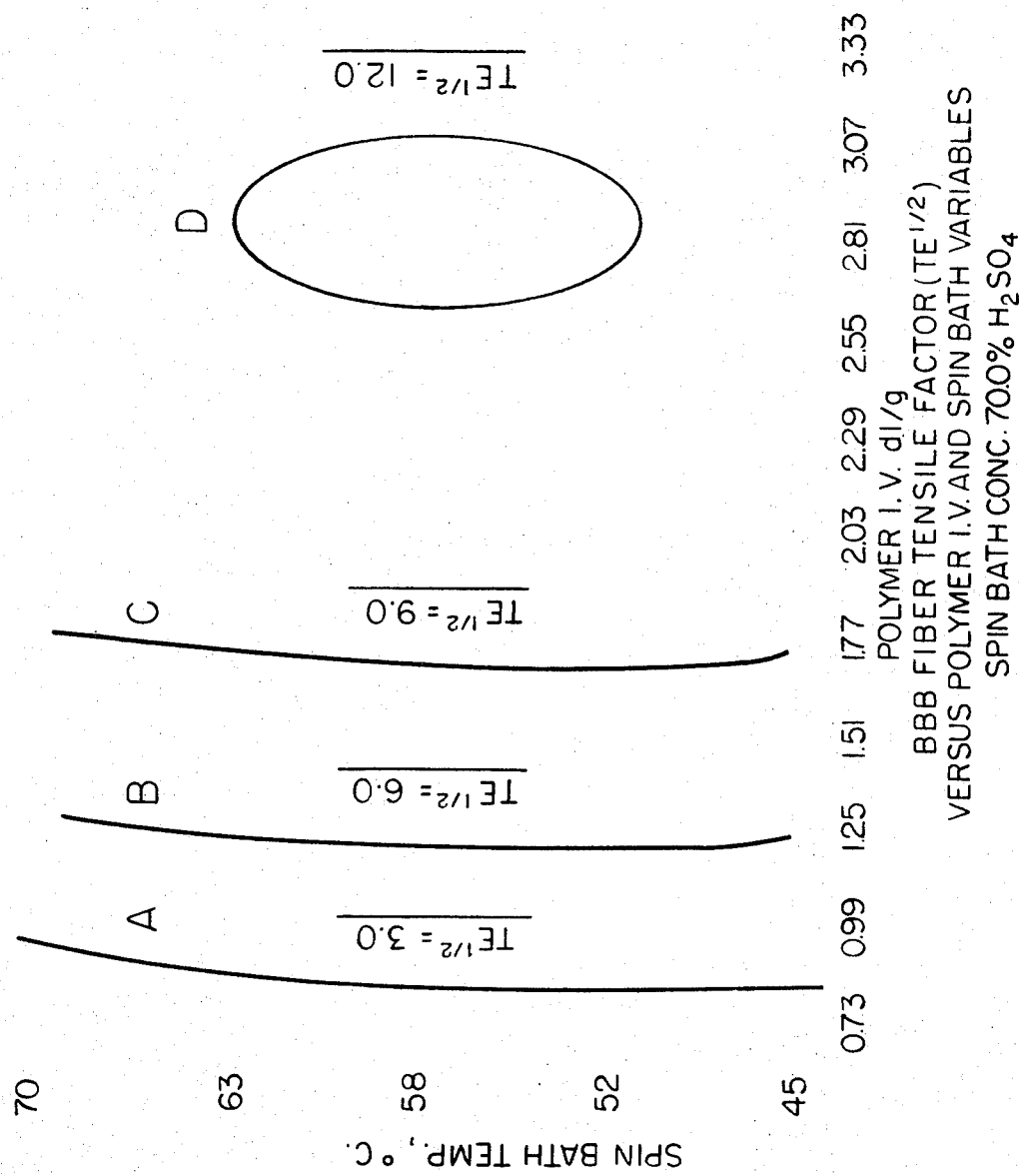

The critical nature of the coagulation bath conditions and polymer I.V. is evidenced by the coagulation bath contour characterizations which are illustrated in said FIGS. 1 and 2. These contour characterizations emphasize the direct effects of polymer I.V., spin-bath temperature, and spin-bath concentration on the precursor (as-spun) properties and tenacity and elongation (in terms of tensile factor as hereinbefore defined) for samples of BBB polymer spinning solutions having I.V.'s from 1.25 to 3.20.

Referring again to FIG. 1, it is apparent that a coagulating bath temperature of between about 57° and 63° C. and a bath concentration of between about 66 and 70 percent $H_2SO_4$ (by weight) must be employed in order to obtain the maximum tensile factor of 7, as illustrated for a polymer I.V. of 1.25 by the area inside the curve marked D. Similarly, it is seen that bath conditions falling outside this area D result in fibers having tensile factor values substantially lower, and therefore more undesirable, than those resulting from the conditions of the present invention.

Likewise, FIG. 2 indicates that at a bath concentration of 70 percent $H_2SO_4$, a bath temperature between about 52° and 64° C. and a polymer I.V. of between 2.6 and 3.1 dl./g. must be employed in order to obtain the maximal tensile factor of 12, as illustrated by the area inside curve D. Similarly, it is seen that bath temperatures and polymer I.V.'s falling outside area D result in fibers having tensile factor values substantially lower, and therefore more undesirable, than those resulting from the conditions of the present invention.

From a comparison of FIGS. 1 and 2, it is readily seen that as the polymer I.V. value increases from 1.25 to between 2.6 and 3.1, the same ranges of spin-bath conditions, viz., about 60° C., 70 percent $H_2SO_4$, result in fiber of increased as-spun tensile factor (from 6 or 7 to about 12). Therein is observed the effect of polymer I.V. upon as-spun tensile factor.

It is to be understood that the foregoing detailed descriptions are given merely by way of illustration and that many variations may be made therein without departing from the spirit of the invention.

The embodiments of the invention in which an exclusive property or privilege is claimed are defined as follows:

1. A process for producing filamentary material exhibiting improved tensile factors at elevated temperatures which comprises extruding a solution of benzimidazobenzophenanthroline polymer in sulfuric acid through a spinneret to form a filament of said solution, passing said filament through a sulfuric acid/water coagulation bath which has a concentration of about 50 to 80 percent by weight of sulfuric acid and which is maintained at a temperature of between about 45 and 80°.

2. The process of claim 1 wherein the benzimidazobenzophenanthroline polymer has an inherent viscosity of between about 1.0 and 4.0.

3. The process of claim 1 wherein said polymer solution contains from about 2 to 15 percent by weight of polymer based on the total weight of said solution.

4. Process for producing filamentary materials exhibiting improved tensile factors at elevated temperatures which comprises extruding a sulfuric acid solution containing about 2 to 15 percent by weight, based on the total weight of said solution of the reaction product of at least one organic tetra-amine having the structural formula:

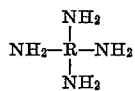

wherein R is an aromatic or cycloaliphatic tetravalent radical, each amino group of said tetra-amine being attached directly to a carbon atom of a ring of said aromatic or cycloaliphatic radical, ortho or peri to the carbon atom to which another amino group is directly attached, with at least one carboxylic acid having the structural formula:

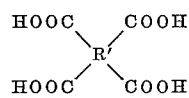

wherein R' is a tetravalent radical containing at least two carbon atoms and wherein no more than two carboxy groups of said acid are attached to any one carbon atom of said tetravalent radical; said solution having an inherent viscosity of between about 1.0 and 4.0, extruding said filament through a sulfuric acid-water coagulation bath which has a concentration of about 50 to 80 percent by weight of sulfuric acid and which is maintained at a temperature of between about 45 and 80° C.

5. The process of claim 4 wherein the polymer is the reaction product of 1,4,5,8-naphthalene tetracarboxylic acid and 3,3'-diamino benzidine.

6. The process of claim 4 wherein said sulfuric acid-water coagulation bath has a concentration of about 60 to 75 percent by weight sulfuric acid.

7. The process of claim 4 wherein said coagulation bath is maintained at a temperature between about 60 to 70° C.

8. The process of claim 4 wherein said solution contains between about 3 to 10 percent by weight of polymer based on the total weight of solution.

9. Process for producing filamentary material exhibiting improved tensile factors at elevated temperatures which comprises preparing a sulfuric acid solution containing about 2 to 15 percent by weight based on the total weight of said solution of the polymeric reaction product of 1,4,5,8-naphthalene tetracarboxylic acid and 3,3'-diaminobenzidine, said polymer having an inherent viscosity between about 1.0 and 4.0, extruding said solution through a spinneret to form a filament of said solution, passing said filament through a sulfuric acid/water coagulation bath which has a concentration of about 60 and 75 percent by weight of sulfuric acid which is maintained at a temperature of between about 60 to 70° C.

References Cited

UNITED STATES PATENTS 3,441,640 4/1969 Santangelo _____ 264—203
3,414,543 12/1968 Paufler.

OTHER REFERENCES

Vogel and Marvel: 50 Journal of Polymer Science 511, "Polybenzimidazoles, New Thermally Stable Polymers," pp. 511–518, April 1961.

JULIUS FROME, Primary Examiner

H. MINTZ, Assistant Examiner

U.S. Cl. X.R.

260—47; 264—203